United States Patent [19]

Fettig et al.

[11] Patent Number: 4,679,364
[45] Date of Patent: Jul. 14, 1987

[54] DOCK SEAL

[75] Inventors: Robert P. Fettig, Waterford; Matthew J. Bushman; Glenn M. Miller, both of Milwaukee, all of Wis.

[73] Assignee: Kelley Company Inc., Milwaukee, Wis.

[21] Appl. No.: 816,347

[22] Filed: Jan. 6, 1986

[51] Int. Cl.$^4$ ............................................. E04H 14/00
[52] U.S. Cl. ................................. 52/173 DS; 14/71.5
[58] Field of Search .................... 14/71.5; 52/173 DS; 49/485

[56] References Cited

U.S. PATENT DOCUMENTS

| 3,341,975 | 9/1967 | Tylisz | 49/485 |
| 3,500,599 | 3/1970 | Sciolino | 52/173 DS |
| 3,638,667 | 2/1972 | Frommelt et al. | 52/173 DS |
| 4,213,279 | 7/1980 | Layne | 52/173 |
| 4,349,992 | 9/1982 | Layne | 52/173 |
| 4,574,542 | 3/1986 | Kleynjans | 52/173 DS |

OTHER PUBLICATIONS

Hugger 2 Dock Seals.
"Pit Closure for Dock Levelers", Perfect Closure Corp.
Hugger 1 Perfect Closure Corp.
Hugger 1 Dock Seals.
Tufseal, Kelley Company Inc.

Primary Examiner—Stephen J. Novosad
Assistant Examiner—John F. Letchford
Attorney, Agent, or Firm—Andrus, Sceales, Starke & Sawall

[57] ABSTRACT

A dock seal for providing a seal between the end of a truck body and a loading dock. The dock seal includes a pair of resilient pads mounted on the dock alongside a doorway in the dock. The outer face of each pad facing away from the dock has a generally L-shaped configuration including a first surface that extends at an acute angle with respect to the plane of the dock and a shorter second surface that is located inwardly of the first surface and extends at an angle of about 90° with respect to the first surface. As a truck backs toward the loading dock, the end of the truck body will engage the first surface of the pad, compressing the pad and deflecting the first surface into engagement with the side wall of the truck body and correspondingly moving the second surface of the pad into engagement with the end of the truck body to seal the gap between the end of the truck body and an openly swung truck body door.

21 Claims, 4 Drawing Figures

DOCK SEAL

BACKGROUND OF THE INVENTION

Dock seals are commonly used in association with loading docks to provide a seal between the end of a truck body parked in front of the loading dock and the dock. The use of a dock seal is particularly important when a loading operation is being carried out at a cold storage warehouse to prevent warmer ambient air from entering the warehouse. Conversely, in cold weather climates, it is desirable to provide a seal between the truck body and the dock to prevent the colder ambient air from entering the warehouse or other facility.

The conventional dock seal includes a pair of resilient pads, commonly made of foam plastic material, which are mounted alongside the doorway in the loading dock. In addition, a header formed of resilient material can also be mounted along the upper edge of the doorway, connecting the upper ends of the two side pads. In order to accommodate truck bodies of varying widths, the side pads of the dock seal have a substantial width, and as a truck backs toward the loading dock, the rear end of the truck body will engage and compress the pads to provide a seal between the truck body and the dock.

However, the use of the conventional dock seal has certain disadvantages. The side pads of the dock seal will normally protrude inwardly of the sides of the truck body, thereby limiting access to the truck body and complicating end loading and unloading operations. Further, the edges of dock seal pads projecting into the truck body can be contacted by a fork lift truck moving between the dock and the truck bed, frequently causing damage to the pads.

It has also been found that when the truck is provided with an overhead door, the truck will normally back toward the dock with the door closed. With the use of the conventional dock seal, the handle for the overhead door will usually be embedded within the compressed side panel of the dock seal. The workman must then attempt to locate the handle and pull the handle upwardly against the force of the compressed seal. This not only is difficult, but in some instances the handle can rip the fabric covering of the dock seal.

As an alternate sealing mechanism, dock shelters have also been utilized. The conventional dock shelter, includes a pair of side panels which are mounted on the dock alongside the doorway and are adapted to be moved into contact with the outer side wall of the truck body to provide a weather seal.

A dock shelter has the advantage that there is no encroachment on the interior of the truck body, but a dock shelter is normally more complicated in operation and considerably more expensive than a dock seal.

As a further disadvantage, the conventional dock shelter will not provide a complete seal when the truck body has outwardly swinging doors. In normal practice, the outwardly swinging doors of the truck body are swung to the open position, against the sides of the truck body, before the truck backs toward the loading dock. With the doors swung open, the side panels of the dock shelter will engage the open doors, as opposed to engaging the side wall of the truck body, and no seal is provided for the gap between the outwardly swung doors and the truck body. There can be considerable air movement through this gap which destroys the basic sealing objective.

SUMMARY OF THE INVENTION

The invention is directed to an improved dock seal which provides a positive seal against the side of the truck body, as well as the end of the body and yet does not encroach on the interior of the truck body. In accordance with the invention, the dock seal includes a pair of resilient pads, each mounted alongside the doorway in a loading dock. The outer face of each pad is generally V-shaped in configuration, including a first surface which is positioned at an acute angle with respect to the plane of the loading dock, and a second shorter surface located inwardly of the first surface and extending at an angle of about 90° with respect to the first surface.

The resilient pads are covered with an outer protective covering and in addition, a relatively stiff sheet of material, having a low coefficient of frictional resistance, is applied to the first surface of each pad.

As a truck backs toward the loading dock, the end of the truck body will engage the first surface of each pad, compressing and deforming the pad to bias the first surface of the pad into tight engagement with the side wall of the truck body, while the second surface will be moved into engagement with the end of the truck body, thereby providing a complete seal.

If the truck has outwardly swinging doors, the pads will completely bridge the gap between the open door and the side wall of the truck body, thereby completely sealing the gap.

In the sealing position, the pads do not encroach on the interior of the truck body, thereby providing complete access to the truck body for the loading operation.

The dock seal of the invention is capable of providing a complete seal for truck bodies of varying width, without any change or alteration in the construction of the sealing pads. Due to the flexibility and configuration of the pads, a positive weather seal will be obtained even though the truck may be in an off-center or skewed position relative to the dock.

The dock seal is of simple and inexpensive construction, and requires no power source for operation.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
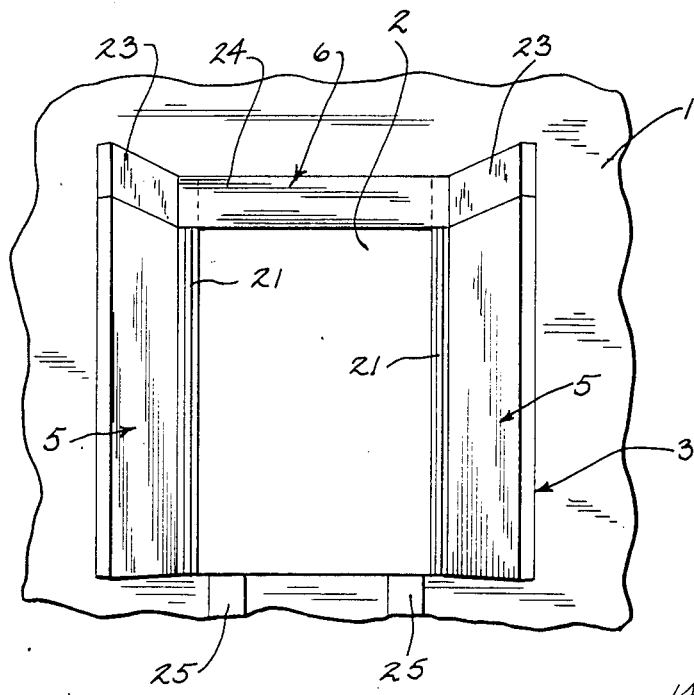
FIG. 1 is a elevation view of a loading dock incorporating the dock seal of the invention.

FIG. 1 illustrates a loading dock 1 having a doorway 2 which is normally enclosed by an overhead door, not shown. The dock seal 3 of the invention is mounted on the outer wall of the dock bordering the doorway 2 and is adapted to be engaged by the end of a truck body 4 parked in front of the dock.

Dock seal 3 includes a pair of side sections 5 which are mounted adjacent the sides of doorway 2, and a header section 6 which connects the upper ends of the side sections 5.

Figure 3:
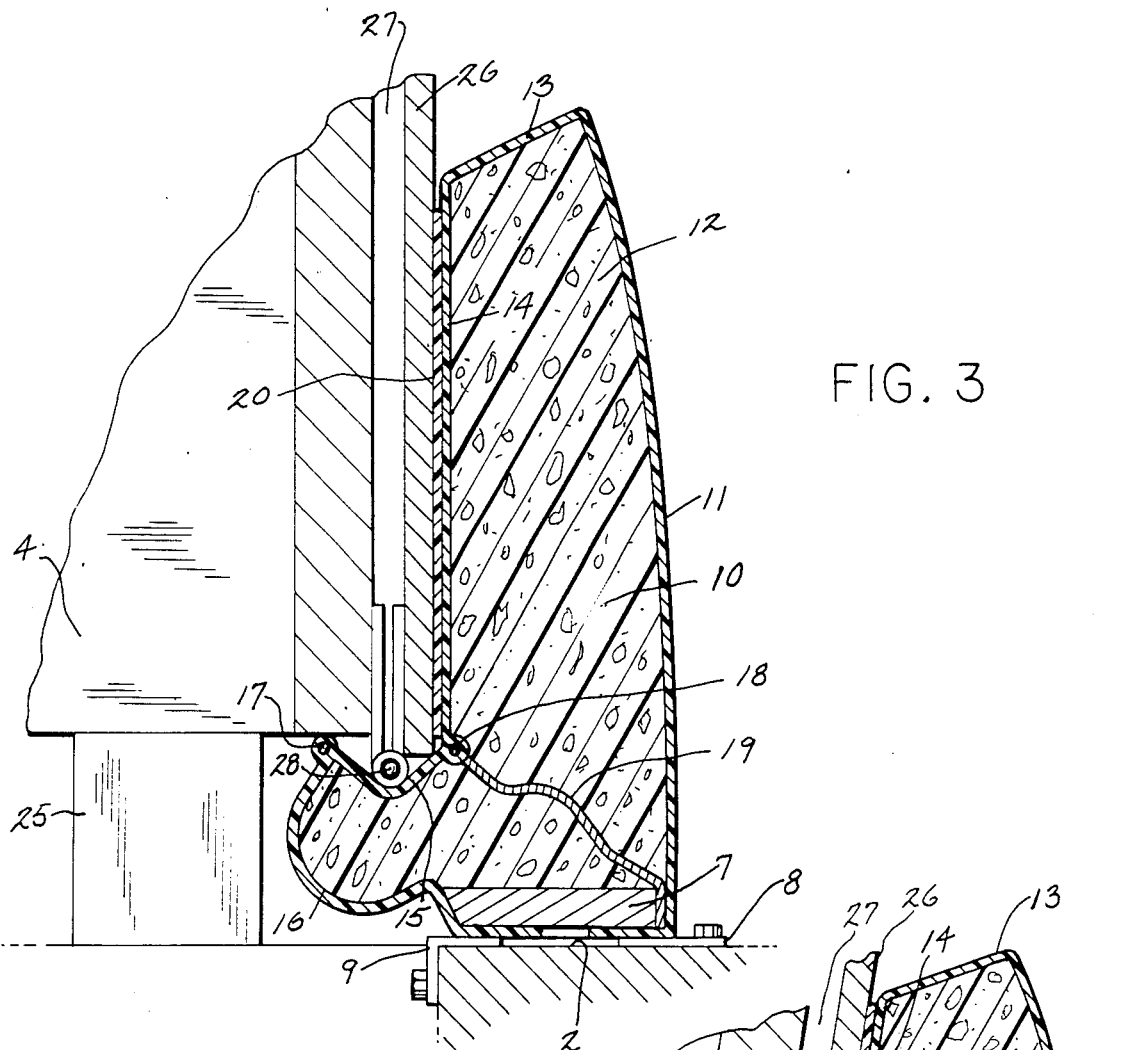
FIG. 3 is a view similar to FIG. 2 showing the pad in sealing condition with the end of a truck body.

As best illustrated in FIG. 3, each side section 5 includes a mounting member 7, which can take the form of a wooden board, or metal plate, and the mounting member is connected to the face of the dock through a series of vertically spaced brackets 8 and is similarly connected to the jamb of doorway 2 by a series of brackets 9.

Figure 2:
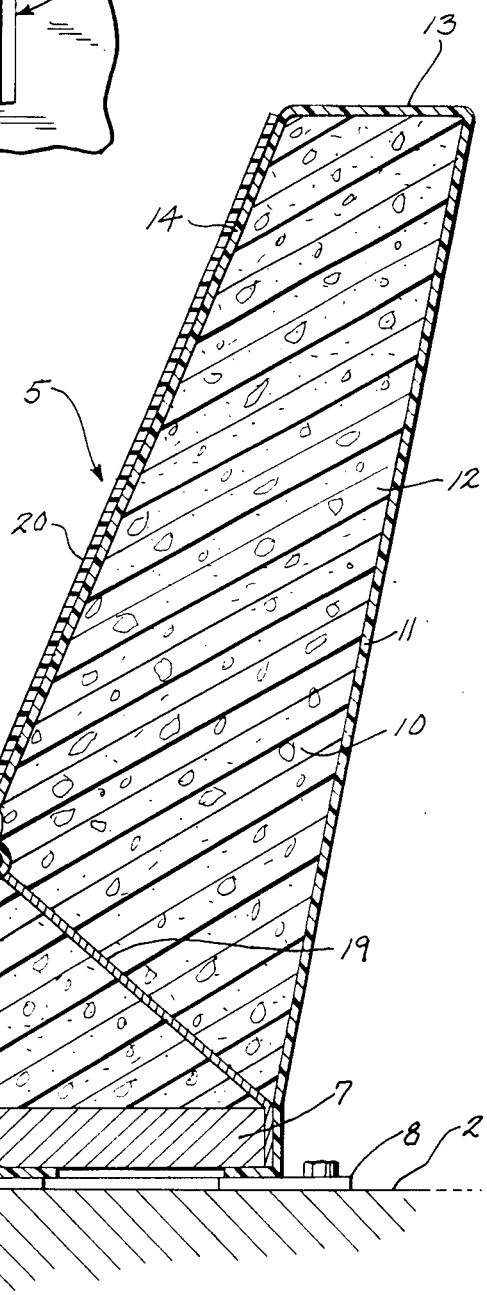
FIG. 2 is a horizontal section of one of the side pads.

Bonded to the mounting member 7 is resilient flexible pad 10 formed of foam rubber or plastic. Pad 10 is covered with an outer protective covering of coated fabric 11. As shown in FIG. 2, each pad is provided with a surface 12 that extends outwardly from the dock and an outer surface 13 which is disposed generally parallel to the dock. Extending inwardly from surface 13 is an angular surface 14 which is located at an acute angle with respect to the dock face, generally in the range of about 50° to 70°. Connected to the inner end of surface 14 is a shorter surface 15 which extends at an angle of about 85° to 95°. and preferably 90° with respect to surface 14. Surface 16 connects the inner edge of surface 15 to the inner face of the pad 10. Surfaces 14 and 15 provide the outer face of pad 10 with a generally L-shaped configuration.

An elongated, flexible, rope-like strand 17 of flexible material is located at the junction between surfaces 15 and 16 and is enclosed by the coated fabric layer 11. Strand 17 provides a reinforcement for the relatively sharp outside corner between surfaces 15 and 16.

To retain the covering 11 in the inside corner between the surfaces 14 and 15, a rod 18 extends vertically throughout the length of the pad 10 and the covering 11 is wrapped around the rod. A series of straps 19 of flexible material connect rod 18 to the mounting member 8 and are spaced along the height of the pad 10. As the covering material 11 is wrapped around rod 18, the rod will properly retain the covering in the corner between surfaces 14 and 15.

Mounted on surface 14 is a sheet of flexible protective material 20. The sheet 20 should be relatively stiff in a horizontal direction and be capable of withstanding the impact of a truck backing against it. In addition, the material should have a relatively low coefficient of friction so that the end of the truck body will slide on the sheet 20. It has been found that a sheet of woven fabric coated with vinyl or urethane provides a suitable material for the sheet 20.

To aid in properly aligning the truck body with the dock seal, a guide stripe 21 having a yellow, or other bright color, can be applied to the surface 15. The strips 21 serve as a guide to the truck driver looking through the rear vision mirror to properly align the truck body with the side sections 5 of the seal.

In addition, the sheets 20 can also be formed of a bright or distinctive color to serve as a secondary guide for alignment purposes. With outwardly swinging doors in the open position, it may be difficult for the truck driver to see the guide stripe 21, in which case, the brightly colored sheets 20 can serve sas a secondary guide to aid in aligning the truck with the seal.

The header section 6 includes a pair of end caps 23 of fabric material which fit over ends of the side sections 5 to provide additional weather protection for the side sections. A flexible flap of fabric material 24 connects the caps 23 together and is adapted to engage the upper surface of the truck body when the truck is parked in front of the dock.

When a truck backs toward the loading dock, the end of the truck body 4 will engage the sheets 20 on surfaces 14 and the truck body will ride along the surface 14, compressing and deforming pad 10. The truck body will then engage the bumpers 25 which are mounted on the dock beneath the doorway, thereby stopping the inward movement of the truck body. Due to the angularity of surfaces 14 and 15, and the flexible nature of pad 10, the surface 14 will be urged into tight engagement with the side of the open swinging door 26, while the surface 15 will be in tight engagement with the end of the truck body and spans the gap 27 between the open door and the truck body. As shown in FIG. 3, the pad 10 will provide a complete seal across the gap 27, while accommodating the spaced hinges 28, thereby preventing flow of air through the gap.

Figure 4:
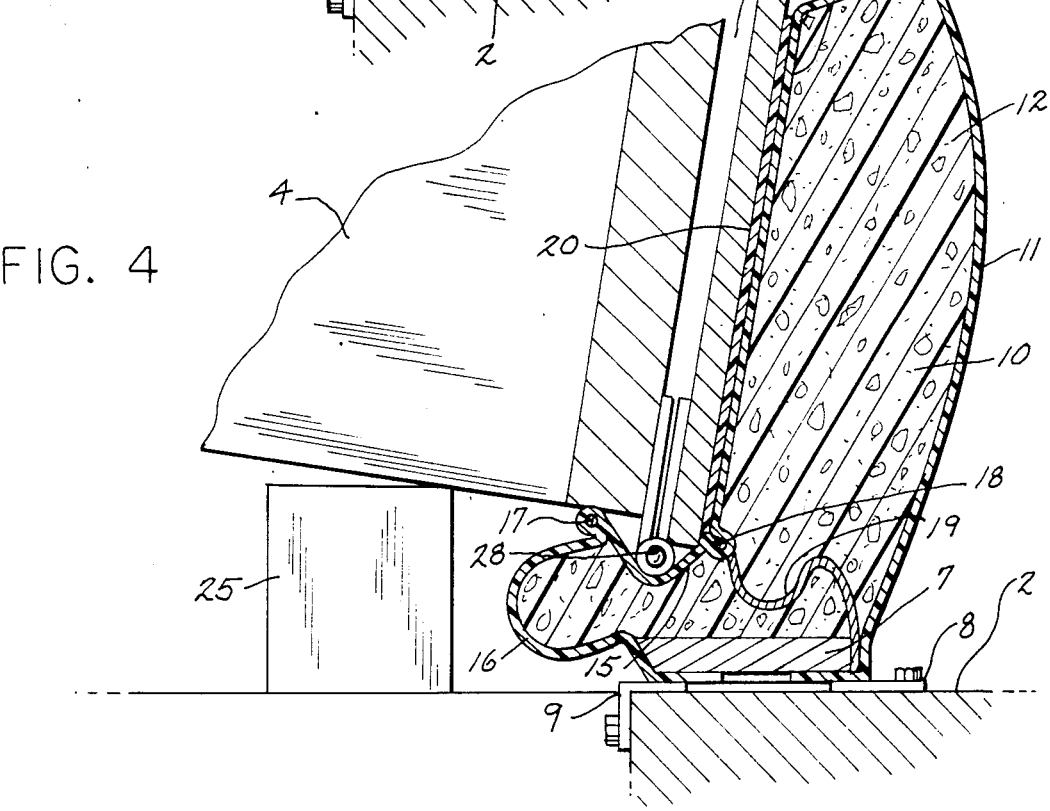
FIG. 4 is a view similar to FIG. 3 and showing a truck body in an off-center and skewed position relative to the dock.

FIG. 4 shows a situation where the truck body is positioned off-center with respect to doorway 2 and is slightly skewed, or at an angle, to the dock. In this case the flexibility of pad 10 will conform to the position of the truck body 4, so that the surface 14 will be biased against the outwardly swung door 26 and the surface 15 will be engaged with the end of the truck body.

The dock seal of the invention provides an effective seal against the rear end of the truck body, including the gap between the open door and the truck body, without encroaching on the interior of the body.

Various modes of carrying out the invention are contemplated as being within the scope of the following claims particularly point out and distinctly claiming the subject matter which is regarded as the invention.

I claim:

1. In combination, a loading dock having a wall with a doorway therein, a dock seal mounted on the outer surface of said wall and bordering said doorway, said dock seal including a pad of resilient material mounted along the side of said doorway, said pad having an outer end and having an inner end mounted on said wall, said pad including a first vertical surface extending inwardly toward the dock from said outer end, said pad also having a second vertical surface extending laterally in a direction toward the center of said doorway and disposed generally normal to said first surface, said first and second surfaces being joined at an inside vertically extending corner, and a sheet of impact resistant flexible material disposed on said first surface, said first and second surfaces being constructed and arranged so that engagement of said pad by a truck body backing toward the dock will compress and deform said pad to urge said first surface into engagement with the outer side of the truck body and move said second surface into engagement with the rear end of the truck body.

2. A dock seal having use in sealing a gap between an outwardly swung door and the side of a truck body, comprising a pad of resilient material mounted along the side of a doorway in a loading dock, said pad having an outer end and having an inner end mounted on the dock, said pad having a first vertical surface extending inwardly toward the dock from the outer end and disposed at an angle of about 50° to 70° with respect to said dock, said pad also having a second vertical surface connected to the inner end of said first surface and disposed at an angle of about 90° with respect to said first surface, said first and second surfaces being joined at an inside vertically extending corner, said first and second surfaces being constructed and arranged so that engagement of said pad by a truck body backing toward the dock will compress and deform said pad to urge said first surface into engagement with the outer side of the outwardly swung door of the truck body and move said second surface into engagement with the rear end of the truck body to seal the gap between said outwardly swung door and the side of said truck body.

3. A dock seal for providing a seal between a truck body and a loading dock, comprising a pad of resilient material mounted along the side of a doorway in a loading dock, said pad having an outer end and having an inner end mounted on the dock, said pad having a first vertical surface extending inwardly toward the dock from said outer end and disposed at an acute angle with respect to said dock, said pad also having a second vertical surface connected to the inner end of said first surface and extending outwardly from said first surface in a direction away from said dock, said first and second surfaces being joined at an inside vertically extending corner, said first and second surfaces being constructed and arranged so that engagement of said pad by a truck body backing toward the dock will compress and deform said pad to urge said first surface into engagement with the outer side of the truck body and move said second surface into engagement with the rear end of the truck body.

4. The dock seal of claim 3, wherein said first and second surfaces are joined at a substantially right angle corner.

5. The dock seal of claim 3, and a vertical guide strip on said second surface.

6. The dock seal of claim 3, and including a covering disposed on the outer surface of said pad.

7. The dock seal of claim 3, wherein said second surface has a shorter horizontal length than said first surface.

8. The dock seal of claim 3, wherein said outer end is generally flat and is disposed parallel to said inner end.

9. The dock seal of claim 3, and including a sheet of impact resistant flexible material disposed on said first surface.

10. The dock seal of claim 9, wherein said sheet is flexible in a horizontal direction.

11. The dock seal of claim 9, wherein said material is plastic and has a low coefficient of friction.

12. The dock seal of claim 3, and including a covering disposed on the outer surface of said pad.

13. The dock seal of claim 12, including an elongated member disposed adjacent said corner and engaged with said covering to maintain said covering in said corner.

14. The dock seal of claim 13, and including a connector embedded within said pad and connecting said elongated member with said dock.

15. The dock seal of claim 14, wherein said elongated member is a rod and said connecting member is a flexible strip.

16. In combination, a loading dock having a wall with a doorway therein, and a dock seal mounted on the outer surface of said wall and bordering said doorway, said dock seal including a pad of resilient material mounted along the side of said doorway, said pad having an outer end and having an inner end mounted on said wall, said pad including a first vertical surface extending inwardly toward the dock from said outer end and disposed at an acute angle with respect to said dock, said pad also having a second vertical surface connected to the inner end of said first surface and extending outwardly from said first surface in a direction away from said dock, said first and second surfaces being joined at an inside vertically extending corner, said first and second surfaces being constructed and arranged so that engagement of said pad by a truck body backing toward the dock will compress and deform said pad to urge said first surface into engagement with the outer side of the truck body and move said second surface into engagement with the rear end of the truck body.

17. The combination of claim 16, and including a bumper mounted on said wall at a level beneath said doorway, said bumper having an outer face disposed inwardly toward said wall from said first and second surfaces.

18. The combination of claim 16, wherein said first and second surfaces are joined at a substantially right angle corner and said first surface is disposed at an angle of about 50° to 70° with respect to said wall.

19. The combination of claim 16, wherein said second surface projects laterally inward toward the center of said doorway.

20. The combination of claim 19, wherein said pad includes a third vertical surface connecting the inner end of said second surface with the inner end of said pad, and said combination including an elongated flexible reinforcing member disposed along the junction of said second and third surfaces.

21. The combination of claim 20, wherein said third surface is disposed at an acute angle with respect to said second surface.

* * * * *